US012780123B2

(12) United States Patent
Matsumoto et al.

(10) Patent No.: US 12,780,123 B2
(45) Date of Patent: Nov. 3, 2026

(54) IN-VEHICLE NETWORK SYSTEM AND CONTROL METHOD

(71) Applicant: DENSO CORPORATION, Kariya-city (JP)

(72) Inventors: Sho Matsumoto, Kariya-city (JP); Tomohisa Kishigami, Kariya-city (JP); Youichi Hayase, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/283,827

(22) Filed: Jul. 29, 2025

(65) Prior Publication Data

US 2026/0084638 A1 Mar. 26, 2026

(30) Foreign Application Priority Data

Sep. 23, 2024 (JP) ................................ 2024-164680

(51) Int. Cl.

*B60R 16/023* (2006.01)
*H04L 12/40* (2006.01)
*H04W 4/48* (2018.01)

(52) U.S. Cl.

CPC .......... *B60R 16/0232* (2013.01); *H04L 12/40* (2013.01); *H04W 4/48* (2018.02); *H04L 2012/40273* (2013.01)

(58) Field of Classification Search

CPC ................. B60R 16/0232; H04L 12/40; H04L 2012/40273; H04W 4/48

See application file for complete search history.

(56) References Cited

U.S. PATENT DOCUMENTS

| | | | | |
|---|---|---|---|---|
| 2021/0009054 A1 | 1/2021 | Hirano | | |
| 2021/0014082 A1 | 1/2021 | Hirano | | |
| 2022/0055556 A1 | 2/2022 | Hirano | | |
| 2025/0238384 A1* | 7/2025 | Ushiro | .................... | B60R 16/02 |
| 2026/0067128 A1* | 3/2026 | Matsumoto | ....... | H04L 12/40039 |
| 2026/0067129 A1* | 3/2026 | Matsumoto | ....... | H04L 12/40039 |

* cited by examiner

*Primary Examiner* — Daniel Cavallari

(74) *Attorney, Agent, or Firm* — Posz Law Group, PLC

(57) ABSTRACT

An in-vehicle network system includes control devices connected to a communication bus and configured to communicate with each other. The control devices includes startup control target control devices, each of which stores cluster configuration information. Each startup control target control device enters to a startup state or maintains the startup state. The control devices further include a management control device configured to change the cluster configuration information of the startup control target control devices. The startup control target control devices have cluster configuration information for normal operation and cluster configuration information for abnormal occurrence. At least one of the startup control target control devices that detects occurrence of an abnormality in the management control device or an abnormality in communication with the management control device switches the cluster configuration information for normal operation to the cluster configuration information for abnormal occurrence.

16 Claims, 10 Drawing Sheets

FIG. 3

| PNC CONFIG TABLE | |
|---|---|
| NODE ID | PNC CONFIG INFO |
| A | 01010111··· |
| B | 11100101··· |
| ⋮ | ⋮ |
| N | 11110001··· |

FIG. 4

| RELAY CIRCUIT/ PORT NO | NODE ID |
|---|---|
| 1 | A |
| 2 | B |
| ⋮ | ⋮ |
| X | N |

IN-VEHICLE NETWORK SYSTEM AND CONTROL METHOD

CROSS REFERENCE TO RELATED APPLICATION

This application is based on Japanese Patent Application No. 2024-164680 filed on Sep. 23, 2024, the disclosure of which is incorporated herein by reference.

TECHNICAL FIELD

The present disclosure relates to an in-vehicle network system including multiple control devices connected to a communication bus and capable of mutual communication within a vehicle, and a control method for the in-vehicle network system.

BACKGROUND

For example, a related art discloses an in-vehicle network system equipped with an upper ECU, an intermediate ECU, and a lower ECU. In the in-vehicle network system, the intermediate ECU receives power from a power supply and supplies power from the power supply to the lower ECU based on a message received from the upper ECU. In other words, the intermediate ECU maintains the lower ECU in a power-off state until a message is received from the upper ECU. Upon receiving the message from the upper ECU at the intermediate ECU, power from the power supply is supplied to the lower ECU. The lower ECU transitions from the power-off state to a standby state awaiting instructions due to this power supply.

SUMMARY

According to an aspect of the present disclosure, an in-vehicle network system including a plurality of control devices connected to a communication bus and configured to communicate with each other in a vehicle is provided. The plurality of the control devices may include a plurality of startup control target control devices, each of which stores cluster configuration information indicating a cluster to which it belongs within a plurality of divided clusters, and when a network management message transmitted from another control device includes startup cluster information indicating a cluster to be activated that matches the cluster in the cluster configuration information, each startup control target control device may enter to a startup state or maintain the startup state. The plurality of the control devices may further include a management control device configured to change the cluster configuration information of the plurality of the startup control target control devices. The plurality of the startup control target control devices may have cluster configuration information for normal operation and cluster configuration information for abnormal occurrence, as the cluster configuration information. At least one of the startup control target control devices that detects occurrence of an abnormality in the management control device or an abnormality in communication with the management control device may switch the cluster configuration information for normal operation to the cluster configuration information for abnormal occurrence.

BRIEF DESCRIPTION OF DRAWINGS

Objects, features and advantages of the present disclosure will become more apparent from the following detailed description made with reference to the accompanying drawings. In the drawings:

FIG. 3 is a diagram showing an example of a PNC configuration table stored in the storage unit of the power/startup management ECU;

FIG. 4 is a diagram showing an example of relay connection information stored in the storage unit of the power/startup management ECU;

DETAILED DESCRIPTION

Figure 1:
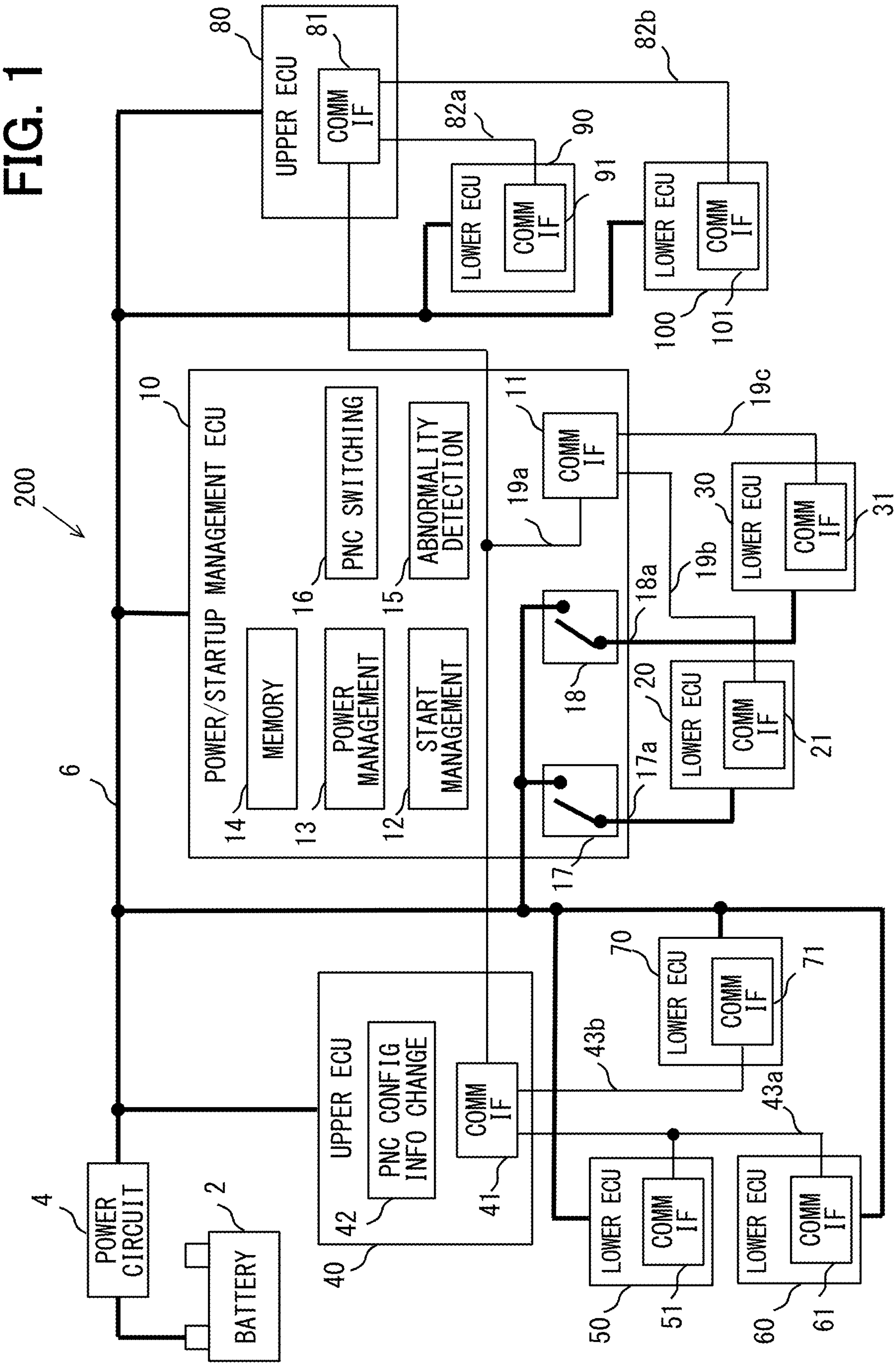
FIG. 1 is a configuration diagram showing an example of the configuration of an in-vehicle network system according to the first embodiment.

As described above, in the conventional in-vehicle network system disclosed in a related art, a specific ECU (e.g., an intermediate ECU) is configured to manage the state of other ECUs (e.g., lower ECUs).

However, when the relationship between other ECUs and the specific ECU managing their state is fixed, it may be difficult to manage the state of other ECUs in a detailed manner. Therefore, for example, it has been put into practical use to assign clusters, which are groups of ECUs activated simultaneously to achieve desired functions, to each ECU and to use network management messages to switch each ECU to a startup state or a sleep state by a cluster.

In recent years, it is becoming possible for the software of ECUs installed in a vehicle to be updated after the vehicle is sold and distributed in the market, for example, by the vehicle user downloading arbitrary applications. In this case, depending on the functions of the downloaded application, the ECU with updated software may be required to activate not only under the conditions set before the update but also, or instead, when different conditions are met.

Therefore, if it is necessary to change the startup conditions of an ECU with updated software, it is conceivable that a specific management ECU of the in-vehicle network system receives cluster configuration information corresponding to the changed startup conditions from an external source (e.g., an application provider) and changes the cluster configuration information indicating the cluster to which the ECU with updated software belongs.

However, in this case, if an abnormality occurs in the management ECU or if there is an abnormality in communication with the management ECU, the management ECU may be unable to appropriately change the cluster configuration information of each ECU. As a result, ECUs may activate at unintended times, leading to unnecessary power consumption and improper control of ECU startup.

The present disclosure provides an in-vehicle network system and a control method for an in-vehicle network system that can appropriately control the startup of startup control target control devices even if an abnormality occurs in a management control device capable of executing changes to the cluster configuration information of the startup control target control devices, or if there is an abnormality in communication with the management control device.

According to an aspect of the present disclosure, an in-vehicle network system includes a plurality of control devices connected to a communication bus and configured to communicate with each other in a vehicle. The plurality of the control devices includes a plurality of startup control target control devices, each of which stores cluster configuration information indicating a cluster to which it belongs within a plurality of divided clusters, and when a network management message transmitted from another control device includes startup cluster information indicating a cluster to be activated that matches the cluster in the cluster configuration information, each startup control target control device enters to a startup state or maintains the startup state. The plurality of the control devices further include a management control device configured to change the cluster configuration information of the plurality of the startup control target control devices. The plurality of the startup control target control devices have cluster configuration information for normal operation and cluster configuration information for abnormal occurrence, as the cluster configuration information. At least one of the startup control target control devices that detects occurrence of an abnormality in the management control device or an abnormality in communication with the management control device switches the cluster configuration information for normal operation to the cluster configuration information for abnormal occurrence.

Additionally, according to an aspect of the present disclosure, a method for controlling an in-vehicle network system including a plurality of control devices connected to a communication bus and configured to communicate with each other in a vehicle is provided. The plurality of the control devices includes a plurality of startup control target control devices, each of which stores cluster configuration information indicating a cluster to which it belongs within a plurality of divided clusters. When a network management message transmitted from another control device includes startup cluster information indicating a cluster to be activated that matches the cluster in the cluster configuration information, each startup control target control device enters to a startup state or maintains the startup state. The plurality of the control devices further include a management control device configured to change the cluster configuration information of the plurality of the startup control target control devices. The plurality of the startup control target control devices have cluster configuration information for normal operation and cluster configuration information for abnormal occurrence, as the cluster configuration information. The method includes, by at least one of the startup control target control devices, detecting occurrence of an abnormality in the management control device or an abnormality in communication with the management control device, and by the least one of the startup control target control devices that has detected the occurrence of the abnormality, switching the cluster configuration information for normal operation to the cluster configuration information for abnormal occurrence.

According to the in-vehicle network system and the control method for an in-vehicle network system of the present disclosure, the startup control target control devices have, in advance, cluster configuration information for normal operation and cluster configuration information for abnormal occurrence (also referred to as abnormal operation). When an abnormality occurs in the management control device or in communication with the management control device, at least one startup control target control device that detects the abnormality switches the cluster configuration information for the normal operation to the cluster configuration information for the abnormal occurrence. As a result, the at least one startup control target control device is activated according to the cluster configuration information for the abnormal occurrence. This allows for appropriate control of the startup of startup control target control devices even if an abnormality occurs in the management control device or in communication with the management control device.

Embodiments of the in-vehicle network system and a control method for an in-vehicle network system according to the present disclosure will be described with reference to the drawings. However, the present disclosure is not limited to the following embodiments, and various modifications described later are also included within the technical scope of the present disclosure. Furthermore, various changes can be made within the scope that does not deviate from the spirit of the present disclosure. The embodiments and various modifications can be appropriately combined and implemented as long as no technical contradictions arise. In the following description, identical or similar configurations may be assigned the same reference numbers across multiple drawings, and explanations may be omitted. Additionally, when referring to only part of a configuration, the description provided elsewhere may be applied to other parts.

First Embodiment

FIG. 1 is a configuration diagram showing an example of the configuration of the in-vehicle network system 200 according to this embodiment. As shown in FIG. 1, the in-vehicle network system 200 includes a power/startup management ECU 10*a*, first upper ECU 40, a second upper ECU 80 as upper control devices, and first to seventh lower ECUs 20, 30, 50, 60, 70, 90, 100 as lower control devices. ECU stands for Electronic Control Unit. The power supply lines 6 for the first and second lower ECUs 20, 30 are equipped with first and second relay circuits 17, 18, which are switched on and off by the power/startup management ECU 10. On the other hand, the third to seventh lower ECUs 50, 60, 70, 90, 100 receive power directly from the power circuit 4 without passing through relay circuits like the first and second relay circuits 17, 18. Additionally, power is supplied from the power circuit 4 to the power/startup management ECU 10, the first upper ECU 40, and the second upper ECU 80.

The power/startup management ECU 10, the first and second upper ECUs 40, 80, and the first to seventh lower ECUs 20, 30, 50, 60, 70, 90, 100 can each be configured by a computer equipped with a processor, a memory, and a storage. These ECUs are also equipped with communication interfaces (communication IF) 11, 21, 31, 41, 51, 61, 71, 81, 91, 101 for communicating with other ECUs via communication buses 19*a*, 19*b*, 19*c*, 43*a*, 43*b*, 82*a*, 82*b*.

More specifically, the communication IF 11 of the power/startup management ECU 10 is connected to the communication IFs 41, 81 of the first and second upper ECUs 40, 80 via the communication bus 19*a*. The communication IF 11 of the power/startup management ECU 10 is also connected to the communication IF 21 of the first lower ECU 20 via the communication bus 19*b*. Furthermore, the communication IF 11 of the power/startup management ECU 10 is connected to the communication IF 31 of the second lower ECU 30 via the communication bus 19*c*. The communication IF 41 of the first upper ECU 40 is connected to the communication IFs 51, 61 of the third and fourth lower ECUs 50, 60 via the communication bus 43*a*. The communication IF 41 of the first upper ECU 40 is also connected to the communication IF 71 of the fifth lower ECU 70 via the communication bus 43*b*. The communication IF 81 of the second upper ECU 80 is connected to the communication IF 91 of the sixth lower ECU 90 via the communication bus 82*a*. The communication IF 81 of the second upper ECU 80 is also connected to the communication IF 101 of the seventh lower ECU 100 via the communication bus 82*b*. The communication IF 11 of the power/startup management ECU 10 and the communication IFs 41, 81 of the first and second upper ECUs 40, 80 are configured to serve as gateways when the first to seventh lower ECUs 20, 30, 50, 60, 70, 90, 100, connected to different communication buses 19*a*, 19*b*, 19*c*, 43*a*, 43*b*, 82*a*, 82*b*, communicate with each other.

The processor may be, for example, a CPU (Central Processing Unit), MPU (Micro Processing Unit), GPU (Graphics Processing Unit), or DFP (Data Flow Processor) that executes predetermined processing according to a program. The memory is a volatile storage medium, such as RAM (Random Access Memory), that temporarily stores calculation results from the processor. The storage is a non-volatile storage medium, such as flash memory or ROM (Read Only Memory). Various programs and data executed by the processor are stored in the storage. The functions of the power/startup management ECU 10, the first and second upper ECUs 40, 80, and the first to seventh lower ECUs 20, 30, 50, 60, 70, 90, 100 may be realized by hardware, such as ASIC (Application Specific Integrated Circuit) or FPGA (Field-Programmable Gate Array), instead of software like programs.

The in-vehicle network system 200 can use CAN (registered trademark) as the communication protocol for mutual communication among the power/startup management ECU 10, the first and second upper ECUs 40, 80, and the first to seventh lower ECUs 20, 30, 50, 60, 70, 90, 100. CAN stands for Controller Area Network. The communication protocol is not limited to CAN. The in-vehicle network system 200 may adopt another communication protocol, such as CAN-FD (CAN with Flexible Data Rate). However, in the in-vehicle network system 200 of this embodiment, the first to seventh lower ECUs 20, 30, 50, 60, 70, 90, 100 are divided into multiple groups (referred to as clusters) that need to be activated simultaneously to realize at least one desired function. Using the network management message (referred to as a NM message) described later, each cluster switches between normal operation mode (activated state or also referred to as startup state) and power-saving mode (e.g., sleep state). The power-saving mode includes the power-off state of the first and second lower ECUs 20, 30. Therefore, the communication protocol adopted by the in-vehicle network system 200 must support the transmission and reception of NM messages.

The power/startup management ECU 10 and the first and second upper ECUs 40, 80 can each have functions as domain controllers that oversee the control of the first and second lower ECUs 20, 30, the third to fifth lower ECUs 50, 60, 70, and the sixth and seventh lower ECUs 90, 100. A domain refers to a functional unit when broadly dividing the functions of a vehicle, such as the powertrain domain, chassis domain, advanced driver assistance domain, body domain, and cockpit domain. The above is an example of domain division, and the domain division may differ from the example mentioned above. Additionally, the power/startup management ECU 10 and the first and second upper ECUs 40, 80 may each have functions as area controllers that oversee the control of the first and second lower ECUs 20, 30, the third to fifth lower ECUs 50, 60, 70, and the sixth and seventh lower ECUs 90, 100 arranged in each area of the vehicle.

The first to seventh lower ECUs 20, 30, 50, 60, 70, 90, 100 may be, for example, control ECUs for controlling predetermined control targets in the vehicle or sensor ECUs that calculate predetermined physical quantities based on detection signals detected by sensors. When there is a need to control a control target or calculate a predetermined physical quantity based on sensor detection signals, the first to seventh lower ECUs 20, 30, 50, 60, 70, 90, 100 enter an activated state in the normal operation mode and execute normal operations. On the other hand, when there is no need to control a control target or calculate a predetermined physical quantity, the first to seventh lower ECUs 20, 30, 50, 60, 70, 90, 100 enter a power-off state or sleep state in the power-saving mode.

For switching between such activated states and power-off states or sleep states, the first to seventh lower ECUs 20, 30, 50, 60, 70, 90, 100 are each assigned a cluster to which they belong among multiple divided clusters. The assigned cluster is retained as cluster configuration information (also referred to as PNC configuration information) by each ECU. PNC stands for Partial Networking Clustering. However, the PNC configuration information of the first and second lower ECUs 20, 30 is stored in the storage unit 14 of the power/startup management ECU 10, as described later. Based on the startup cluster information (also referred to as PN request information) contained in the NM message, the first to seventh lower ECUs 20, 30, 50, 60, 70, 90, 100 are configured to switch from a power-off state or sleep state to an activated state in response to the request to activate the cluster to which each ECU belongs. Additionally, PNC configuration information may be defined for the power/startup management ECU 10 and the first and second upper ECUs 40, 80.

When the first to seventh lower ECUs 20, 30, 50, 60, 70, 90, 100 each transition to the normal operation mode after entering the startup state, the first to seventh lower ECUs 20, 30, 50, 60, 70, 90, 100 each periodically transmit NM messages to other ECUs while performing their normal operations. Additionally, the power/startup management ECU 10, along with the first and second upper ECUs 40, 80, also periodically transmit NM messages as long as control needs to be continued. Once the necessary processing is completed and there is no need to execute normal operations, the first to seventh lower ECUs 20, 30, 50, 60, 70, 90, 100 stop transmitting NM messages periodically. The third to seventh lower ECUs 50, 60, 70, 90, 100 transition from the normal operation mode to the power-saving mode, switching from the startup state to the sleep state, when the time during which they do not receive NM messages from other ECUs belonging to the same cluster reaches a predetermined standby time. Regarding the first and second lower ECUs 20, 30, the power/startup management ECU 10 monitors the NM messages directed to the first and second lower ECUs 20, 30. When the time during which NM messages directed to the first and second lower ECUs 20, 30 are not received reaches a predetermined standby time, the power/startup management ECU 10 turns off the first and second relay circuits 17, 18, stopping the power supply to the first and second lower ECUs 20, 30.

The third to seventh lower ECUs 50, 60, 70, 90, 100 have communication IFs 51, 61, 71, 91, 101 capable of receiving NM messages while in the sleep state and switching from the sleep state to the startup state in response to receiving NM messages. When activated by the communication IFs 51, 61, 71, 91, 101, the third to seventh lower ECUs 50, 60, 70, 90, 100 determine whether their startup is requested based on the PN request information and PNC configuration information contained in the NM messages. If startup is determined to be requested, the third to seventh lower ECUs 50, 60, 70, 90, 100 continue in the startup state. Conversely, if startup is determined not to be requested, the third to seventh lower ECUs 50, 60, 70, 90, 100 return to the sleep state. The determination based on the PN request information and PNC configuration information may be executed by the communication IFs 51, 61, 71, 91, 101. In this case, if the communication IFs 51, 61, 71, 91, 101 determine that startup is requested based on the PN request information and PNC configuration information, the corresponding ECU is transitioned from the sleep state to the startup state. Below, an example of NM message, the PN request information, and PNC configuration information will be described in detail.

Figure 2:
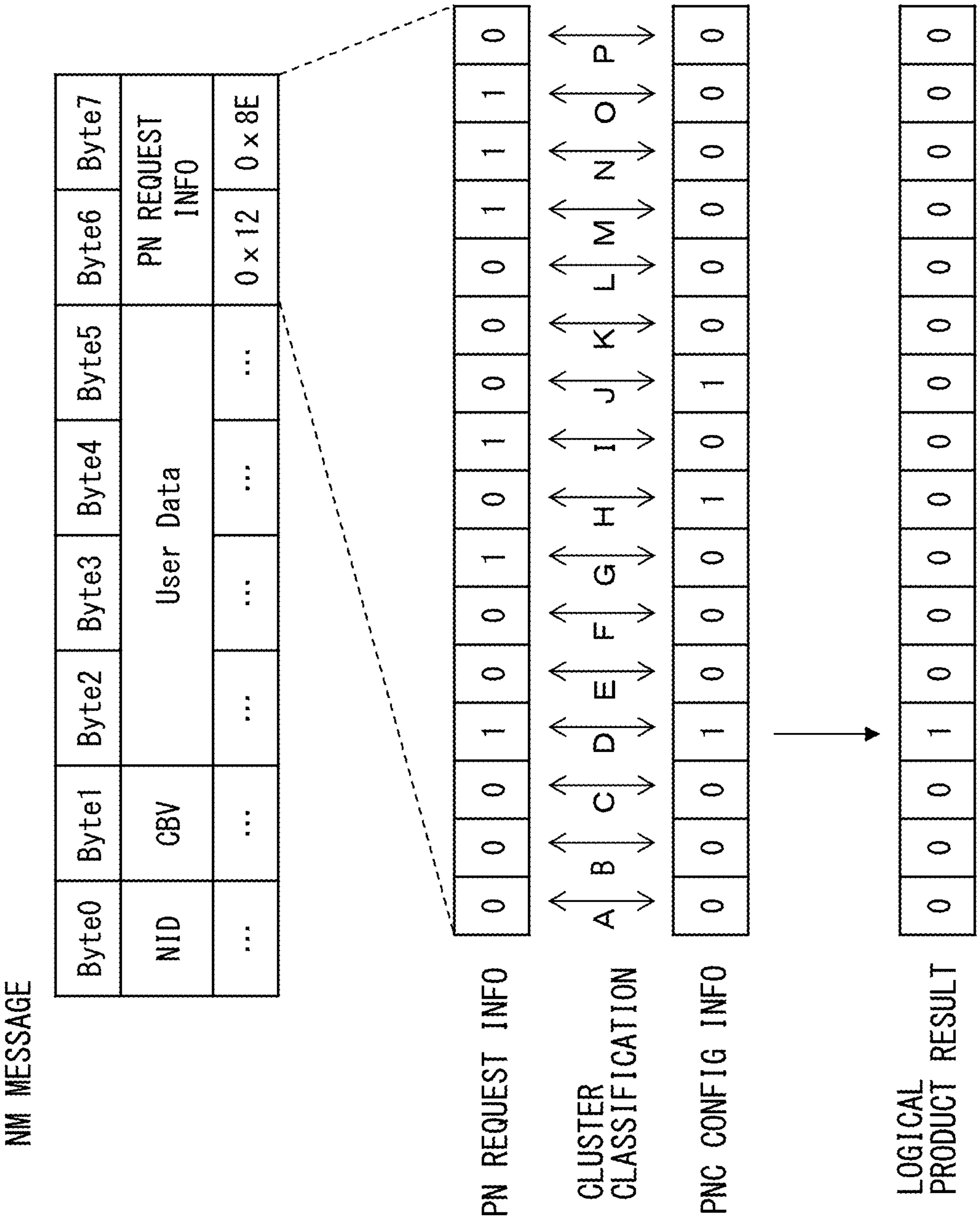
FIG. 2 is an explanatory diagram for explaining an example of NM message, PN (partial network) request information, and PNC configuration information.

The NM message, as shown in FIG. 2, includes data from byte 0 to byte 7. Byte 0 contains the Node ID (NID). The Node ID is a unique identifier for each of the power/startup management ECU 10, the first and second upper ECUs 40, 80, and the first to seventh lower ECUs 20, 30, 50, 60, 70, 90, 100. The Node ID allows identification of the sender of the NM message. Byte 1 contains the Control Bit Vector (CBV). The Control Bit Vector is data indicating whether partial networking (PN) is used. When the Control Bit Vector indicates the use of partial networking, the user data area from byte 2 to byte 7 contains the PN request information, which is startup cluster information indicating the cluster to be activated. Partial networking means activating only the ECUs belonging to certain clusters while keeping the ECUs belonging to other clusters in a power-off state or sleep state. By activating only the ECUs necessary for operation, the power consumption by each ECU installed in the vehicle can be reduced.

In the example shown in FIG. 2, the Control Bit Vector indicates the use of partial networking, and the PN request information is stored in bytes 6 and 7 of the user data area. The user data area from byte 2 to byte 5 can be used to transmit any information, such as ECU startup factors or information related to normal or abnormal conditions. FIG. 2 is merely an example of the format of the NM message, and the NM message may have other formats as long as it includes the indication of partial networking usage and the PN request information.

The PN request information indicates the clusters to be activated and the clusters that do not need startup for each of the multiple divided clusters. More specifically, in the example shown in FIG. 2, the clusters are pre-divided into 16. The PN request information includes 16-bit data corresponding to the 16 divided clusters. That is, the 16-bit data of the PN request information is pre-associated with the 16 divided clusters. When each data bit of the 16-bit PN request information is "0," it indicates that startup of the associated cluster is unnecessary. Conversely, when each data bit of the 16-bit PN request information is "1," it indicates that startup of the associated cluster is necessary.

The first to seventh lower ECUs 20, 30, 50, 60, 70, 90, 100 have PNC configuration information indicating the cluster to which they belong among the multiple divided clusters, as described above. An example of this PNC configuration information is shown in FIG. 2. More specifically, FIG. 2 shows an example of PNC configuration information held by any one of the first to seventh lower ECUs 20, 30, 50, 60, 70, 90, 100. In the PNC configuration information shown in FIG. 2, when the clusters are classified as A to P from left to right in the figure, the PNC configuration information indicates that the ECU holding this information belongs to clusters D, H, and J. The first to seventh lower ECUs 20, 30, 50, 60, 70, 90, 100 can belong to one or more clusters because they can exhibit various functions through program execution and other means.

The third to seventh lower ECUs 50, 60, 70, 90, 100, upon receiving NM messages containing the PN request information via their respective communication IFs 51, 61, 71, 91, 101, compare the PN request information with the PNC configuration information bit by bit, as shown in FIG. 2, and calculate a logical AND, for example. That is, when NM messages are received by the communication IFs 51, 61, 71, 91, 101, the third to seventh lower ECUs 50, 60, 70, 90, 100 temporarily enter the startup state. Then, they determine whether the cluster requested to be activated by the PN request information contained in the NM message matches the cluster indicated by the PNC configuration information assigned to each of the third to seventh lower ECUs 50, 60, 70, 90, 100. For example, in the example shown in FIG. 2, the clusters requested to be activated by the PN request information are clusters D, G, I, M, N, and O. The clusters indicated by the PNC configuration information, to which the ECU belongs, are clusters D, H, and J. In this case, in cluster D, the cluster requested to be activated by the PN request information contained in the NM message matches the cluster of the PNC configuration information. Therefore, as shown in FIG. 2, the result of the logical AND is "1" in cluster D.

If any bit of the logical AND result is "1," the ECU with the PNC configuration information shown in FIG. 2 determines that its startup is requested. Based on this determination result, the ECU with the PNC configuration information shown in FIG. 2 remains transitioned from the sleep state to the startup state, and if already in the startup state, it maintains the startup state. Conversely, if none of the bits of the logical AND result is "1" and all are "0," the ECU with the PNC configuration information shown in FIG. 2 determines that its startup is not requested. In this case, the ECU with the PNC configuration information shown in FIG. 2 discards the received NM message and returns to the sleep state.

Thus, the third to seventh lower ECUs 50, 60, 70, 90, 100 have the function of identifying whether the NM message requests their startup based on the PNC configuration information. With this function of identifying the NM message, only the third to seventh lower ECUs 50, 60, 70, 90, 100 with PNC configuration information that includes the cluster requested to be activated by the PN request information become active by the NM message. Hereinafter, ECUs equipped with the function to receive NM messages and switch from the sleep state to the startup state while in the sleep state will be referred to as NM compatible ECUs.

In the in-vehicle network system 200 according to this embodiment, the first and second lower ECUs 20, 30 do not necessarily have to be NM compatible ECUs. In other words, the first and second lower ECUs 20, 30 may both be NM non-compatible ECUs. NM compatible ECUs, as described above, have communication IF that receive NM messages and switch the ECU from the sleep state to the startup state. Therefore, NM compatible ECUs are more expensive compared to NM non-compatible ECUs. The first and second lower ECUs 20, 30 may be NM non-compatible ECUs, as described above. Consequently, using the first and second lower ECUs 20, 30 as NM non-compatible ECUs as lower control devices can reduce the overall cost of the in-vehicle network system 200.

The in-vehicle network system 200 according to this embodiment is configured such that the power/startup management ECU 10 allows the first and second lower ECUs 20, 30, which are both NM non-compatible ECUs, to be subject to partial networking according to NM messages. Below, the power/startup management ECU 10 according to this embodiment will be described in detail.

As shown in FIG. 1, the power/startup management ECU 10 includes a communication IF 11, a startup management unit 12, a power management unit 13, a storage unit 14, an abnormality detection unit 15, a PNC switching unit 16, and first and second relay circuits 17, 18. The startup management unit 12, the power management unit 13, the abnormality detection unit 15, and the PNC switching unit 16 are functional units constructed within the power/startup management ECU 10 through software and/or hardware. The storage unit 14 can be constituted by the storage of the power/startup management ECU 10.

The first relay circuit 17 is provided in the power supply line 6 for supplying power to the first lower ECU 20. In other words, the power line of the first lower ECU 20 is connected to the first power port 17*a* linked to the first relay circuit 17. The second relay circuit 18 is provided in the power supply line 6 for supplying power to the second lower ECU 30. In other words, the power line of the second lower ECU 30 is connected to the second power port 18*a* linked to the second relay circuit 18.

The number of relay circuits provided in the power/startup management ECU 10 is not limited to two, and it may be three or more. Additionally, the number of lower ECUs connected to each relay circuit is not limited to one; it may be two or more. Furthermore, in the in-vehicle network system 200, the combination of upper ECUs and lower ECUs capable of turning the power supply to lower ECUs on and off may be provided in multiple sets, not just one set.

The power circuit 4 can convert the power voltage of the battery 2 installed in the vehicle to the operating voltage of the power/startup management ECU 10, the first and second upper ECUs 40, 80, and the first to seventh lower ECUs 20, 30, 50, 60, 70, 90, 100 as needed. Voltage from the power circuit 4 is supplied to the power supply line 6 for the power/startup management ECU 10, the first and second upper ECUs 40, 80, and the first to seventh lower ECUs 20, 30, 50, 60, 70, 90, 100.

The first and second relay circuits 17, 18 can be constituted by semiconductor switches such as MOSFETs or IGBTs. However, the first and second relay circuits 17, 18 may be constituted by conventional mechanical relays instead of semiconductor switches. Additionally, the first and second relay circuits 17, 18 may be provided inside the power/startup management ECU 10, as shown in FIG. 1, or outside the power/startup management ECU 10.

The power/startup management ECU 10 is an NM compatible ECU capable of receiving NM messages. The first and second lower ECUs 20, 30 may be NM non-compatible ECUs, as described above. In this embodiment, the first and second lower ECUs 20, 30 enter a power-off state in the power-saving mode when operation is unnecessary. Therefore, the first and second lower ECUs 20, 30 cannot receive NM messages when in the power-saving mode. Consequently, the communication IF 11 of the power/startup management ECU 10 receives NM messages that selectively instruct the startup of the first and second lower ECUs 20, 30 on behalf of the first and second lower ECUs 20, 30. The NM messages received by the communication IF 11 are provided to the startup management unit 12.

Here, the storage unit 14 of the power/startup management ECU 10 stores, in addition to programs executed by the processor of the power/startup management ECU 10, PNC configuration information indicating the clusters to which each of the first and second lower ECUs 20, 30 belongs. Each of the first and second subordinate ECUs 20, 30 is assigned to a cluster. These PNC configuration information include PNC configuration information for normal operation and PNC configuration information for abnormal occurrence. Furthermore, the storage unit 14 stores relay connection information indicating the correspondence between the first and second relay circuits 17, 18 and the first and second lower ECUs 20, 30. For example, the storage unit 14 can store PNC configuration information indicating the clusters assigned to each of the first and second lower ECUs 20, 30 using a PNC configuration table as shown in FIG. 3. The PNC configuration table exemplified in FIG. 3 shows an example of the correspondence between the Node ID, which is a unique identifier for multiple lower ECUs including the first and second lower ECUs 20, 30, and the PNC configuration information assigned to multiple lower ECUs including the first and second lower ECUs 20, 30. Additionally, the storage unit 14 stores relay connection information indicating the correspondence between the numbers or power port numbers of multiple relay circuits including the first and second relay circuits 17, 18 and the Node ID indicating the unique identifiers of multiple lower ECUs including the first and second lower ECUs 20, 30, as exemplified in FIG. 4.

The startup management unit 12 of the power/startup management ECU 10 can acquire the PNC configuration information for each of the first and second lower ECUs 20, 30 by referring to the PNC configuration table exemplified in FIG. 3. Then, the startup management unit 12 can determine which of the lower ECUs 20, 30 has been instructed to activate by the NM message based on the acquired PNC configuration information for the first and second lower ECUs 20, 30 and the PN request information of the NM message. Specifically, the startup management unit 12 compares the PN request information of the NM message with the PNC configuration information for each of the first and second lower ECUs 20, 30 bit by bit. Based on the comparison result, if the startup management unit 12 determines that there is PNC configuration information including the cluster requested to be activated by the PN request information, the startup management unit 12 determines that the startup of the lower ECUs 20, 30 corresponding to that PNC configuration information has been instructed. In this case, the startup management unit 12 provides the Node ID indicating the lower ECUs 20, 30 instructed to activate by the NM message to the power management unit 13. Conversely, if the startup management unit 12 determines that there is no PNC configuration information including the cluster requested to be activated by the PN request information, the received NM message does not instruct the startup of any lower ECUs 20, 30, so it discards the NM message.

The power management unit 13 of the power/startup management ECU 10, upon receiving the Node ID of the lower ECUs 20, 30 instructed to activate from the startup management unit 12, refers to the relay connection information stored in the storage unit 14 indicating the correspondence between each relay circuit 17, 18 and each lower ECU 20, 30. Then, the power management unit 13 identifies the relay circuits 17, 18 corresponding to the Node ID of the lower ECUs 20, 30 instructed to activate and outputs a drive signal to turn on the identified relay circuits 17, 18. As a result, power is supplied through the relay circuits 17, 18 corresponding to the lower ECUs 20, 30 instructed to activate, and the corresponding lower ECUs 20, 30 enter the startup state.

The first and second lower ECUs 20, 30 control control target devices installed in the vehicle that are controlled only when specific conditions are met or under specific environments (e.g., door lock mechanisms, power window drive motors, headlight light sources, wiper motors, AV equipment, etc.) or calculate predetermined physical quantities necessary for their control based on sensor detection signals. For example, the door lock mechanism is controlled by the ECU for door lock control when the vehicle user attempts to enter or exit the vehicle. The power window drive motor is controlled by the ECU for power window control when the window lift switch is operated by the user.

Thus, the first and second lower ECUs 20, 30 control control target devices that operate only when specific conditions are met or under specific environments and calculate predetermined physical quantities necessary for their control. Therefore, when the NM message instructs the startup of the first and second lower ECUs 20, 30, the power/startup management ECU 10 turns on the first and second relay circuits 17, 18 corresponding to the first and second lower ECUs 20, 30 to supply power to them. Conversely, when the NM message does not instruct the startup of the first and second lower ECUs 20, 30, the power/startup management ECU 10 turns off the first and second relay circuits 17, 18 to stop the power supply to the first and second lower ECUs 20, 30. This allows cutting off the dark current when the operation of each lower ECU 20, 30 is unnecessary, enabling further power savings for the entire in-vehicle system.

The NM message can be generated by the power/startup management ECU 10, the first upper ECU 40, and/or the second upper ECU 80 as a function of a domain controller or area controller. In this case, the power/startup management ECU 10, the first upper ECU 40, and/or the second upper ECU 80 determine the functions to be executed in the vehicle based on signals from various sensors and switches. When it is determined that the execution of a desired function is necessary, the power/startup management ECU 10, the first upper ECU 40, and/or the second upper ECU 80 further determine the cluster to which the ECUs that need to be simultaneously activated to execute the relevant function belong and generate an NM message containing the PN request information designating the startup cluster. The generated NM message is transmitted to the first to seventh lower ECUs 20, 30, 50, 60, 70, 90, 100, etc., via communication buses 19*a*, 19*b*, 19*c*, 43*a*, 43*b*, 82*a*, 82*b*. Furthermore, if the NM message is generated by the power/startup management ECU 10, it is also used to determine whether to switch the lower ECUs 20, 30 of the power/startup management ECU 10 itself to the startup state. However, the function of determining the functions to be executed in the vehicle and transmitting NM messages containing the PN request information may be possessed by other ECUs, such as the first to seventh lower ECUs 20, 30, 50, 60, 70, 90, 100, in addition to or instead of the power/startup management ECU 10 and the first and second upper ECUs 40, 80.

Additionally, the power/startup management ECU 10, the first upper ECU 40, and/or the second upper ECU 80 may enter a sleep state if all ECUs belonging to the in-vehicle network system 200 become sleep state or power-off state and the time during which NM messages are not received reaches a predetermined duration.

Furthermore, any ECU belonging to the in-vehicle network system 200, such as the power/startup management ECU 10 or the first and second upper ECUs 40, 80, may implement a PNC configuration information change unit 42 to change the PNC configuration information assigned to each lower ECU 20, 30, 50, 60, 70, 90, 100. FIG. 1 shows an example where the PNC configuration information change unit 42 is implemented in the first upper ECU 40.

The first upper ECU 40, equipped with the PNC configuration information change unit 42, has an external communication device capable of wireless communication with external servers such as data centers. The first upper ECU 40 is configured to download application programs for realizing new functions in the vehicle or update programs for upgrading the version of programs already implemented in any ECU 10, 20, 30, 40, 50, 60, 70, 80, 90, 100 via the external communication device. The downloaded programs are provided to the relevant ECUs 10, 20, 30, 40, 50, 60, 70, 80, 90, 100 via communication buses 19*a*, 19*b*, 19*c*, 43*a*, 43*b*, 82*a*, 82*b*, and the installation of new application programs or rewriting to update programs is executed. The ECU communicating with the data center via the external communication device and the ECU implementing the PNC configuration information change unit 42 may be separate ECUs.

Regarding the ECUs 10, 20, 30, 40, 50, 60, 70, 80, 90, 100 with newly implemented application programs or update programs, it may be necessary to add or change the startup conditions of the relevant ECUs depending on the functions of the application programs or update programs. Therefore, when it is necessary to add or change the startup conditions of an ECU with an implemented application program or update program, the data center downloads new PNC configuration information corresponding to the addition or change of startup conditions to the first upper ECU 40 along with the application program or update program.

When the PNC configuration information change unit 42 acquires new PNC configuration information from the data center, the PNC configuration information change unit 42 changes (rewrites) the PNC configuration information held by the ECUs 10, 20, 30, 40, 50, 60, 70, 80, 90, 100 with implemented application programs or update programs to the new PNC configuration information. As a result, the ECUs 10, 20, 30, 40, 50, 60, 70, 80, 90, 100 with implemented application programs or update programs are switched from the sleep state to the startup state according to the cluster indicated by the changed PNC configuration information. The rewriting of PNC configuration information may be executed by the relevant ECU upon receiving a rewrite instruction along with the new PNC configuration information from the PNC configuration information change unit 42. Alternatively, the rewriting of PNC configuration information may be executed by the PNC configuration information change unit 42 accessing the memory of the relevant ECU.

The PNC configuration information change unit 42 can be provided outside the in-vehicle network system 200, such as in a data center, rather than in an ECU belonging to the in-vehicle network system 200. However, if the PNC configuration information change unit 42 is implemented in an ECU belonging to the in-vehicle network system 200, communication with the outside can be terminated once the data for changing the ECU's PNC configuration information is acquired from the outside. Conversely, if the PNC configuration information change unit 42 is provided on an external server of the in-vehicle network system 200, the ECU requiring a change in PNC configuration information needs to communicate individually with the external server via an ECU equipped with an external communication device. This may lead to the disadvantage of increased communication volume with the external server.

Here, if an abnormality occurs in the first upper ECU 40, in which the PNC configuration information change unit 42 is implemented, which corresponds to the management control device of the present disclosure, or if there is an abnormality in communication with the first upper ECU 40, the first upper ECU 40 may become unable to appropriately change the PNC configuration information of each lower ECU. As a result, there may be a case that, for example, at least one ECU may activate at an unintended timing in response to a NM message, leading to unnecessary power consumption and improper control of ECU startup.

Therefore, in the in-vehicle network system 200 according to this embodiment, the power/startup management ECU 10 is equipped with an abnormality detection unit 15 to detect abnormalities in the first upper ECU 40 and/or abnormalities in communication with the first upper ECU 40. Furthermore, when the abnormality detection unit 15 detects abnormalities in the first upper ECU 40 and/or abnormalities in communication with the first upper ECU 40, a PNC switching unit 16 is provided to switch the PNC configuration information of at least the first and second lower ECUs 20, 30 from PNC configuration information for normal operation to PNC configuration information for abnormal occurrence. Below, the abnormality detection unit 15 and the PNC switching unit 16 will be described in detail.

The power/startup management ECU 10 is configured to periodically communicate with the first upper ECU 40 via the communication bus 19*a*. If this periodic communication is interrupted for more than a predetermined time, the abnormality detection unit 15 of the power/startup management ECU 10 can detect that an abnormality has occurred in communication with the first upper ECU 40. At this time, since communication interruption also occurs in the first upper ECU 40, it can detect that the abnormality has occurred in communication with the power/startup management ECU 10.

Additionally, when the power/startup management ECU 10 and the first upper ECU 40 perform CAN communication, the abnormality detection unit 15 can detect an abnormality in communication with the first upper ECU 40 if abnormalities such as bit errors, format errors, ACK errors, CRC errors, and stuff errors are detected in the communication frame (communication data) due to communication errors. The method for detecting communication errors may vary depending on the communication standard and communication method. It may be preferable for the power/startup management ECU 10 to notify the first upper ECU 40 of the detection of abnormalities in communication data. This allows the first upper ECU 40 to also detect that an abnormality has occurred in communication with the power/startup management ECU 10.

Furthermore, the power/startup management ECU 10 can have a function to monitor whether the first upper ECU 40 is operating normally based on data values related to control received from the first upper ECU 40. For example, the power/startup management ECU 10 can receive control command values output by the first upper ECU 40 to the third to fifth lower ECUs 50, 60, 70, sensor detection values calculated by the first upper ECU 40 as the basis for calculating control command values, and/or self-diagnosis results of the first upper ECU 40 as data values related to control.

The abnormality detection unit 15 of the power/startup management ECU 10 can determine whether the first upper ECU 40 is normal based on whether each data value falls within a predetermined range that can be considered normal when receiving control command values and/or sensor detection values as data values related to control. In other words, the abnormality detection unit 15 can detect an abnormality in the first upper ECU 40 if the received data values deviate from the predetermined range. Additionally, if the abnormality detection unit 15 receives self-diagnosis results of the first upper ECU 40 as data values related to control and the self-diagnosis results indicate that some abnormality has occurred in the first upper ECU 40, it can detect an abnormality in the first upper ECU 40. The self-diagnosis results of the first upper ECU 40 are included in the data values related to control because the self-diagnosis results of the first upper ECU 40 affect the control of the first upper ECU 40 and other ECUs.

The above describes an example where the abnormality detection unit 15 of the power/startup management ECU 10 detects abnormalities in the first upper ECU 40 and communication abnormalities with the first upper ECU 40. However, the abnormality detection unit for detecting abnormalities in the first upper ECU 40 and the abnormality detection unit for detecting communication abnormalities with the first upper ECU 40 may be provided in separate ECUs. For example, an abnormality detection unit for detecting communication abnormalities with the first upper ECU 40 may be provided in the power/startup management ECU 10, and an abnormality detection unit for detecting abnormalities in the first upper ECU 40 may be provided in the third to fifth lower ECUs 50, 60, 70, which are lower ECUs of the first upper ECU 40. Additionally, while the example describes the abnormality detection unit 15 being provided in the power/startup management ECU 10, it may be provided in an ECU other than the power/startup management ECU 10. Furthermore, the abnormality detection unit 15 may be provided in multiple ECUs, including the power/startup management ECU 10.

When the abnormality detection unit 15 detects abnormalities in the first upper ECU 40 and/or communication abnormalities with the first upper ECU 40, the PNC switching unit 16 of the power/startup management ECU 10 switches the PNC configuration information of at least the first and second lower ECUs 20, 30 from the PNC configuration information for normal operation to the PNC configuration information for abnormal occurrence. If PNC configuration information is also defined for the power/startup management ECU 10, the PNC switching unit 16 can also switch the PNC configuration information of the power/startup management ECU 10 to the PNC configuration information for abnormal occurrence.

To enable this switching, the storage unit 14 stores both the PNC configuration information for normal operation and the PNC configuration information for abnormal occurrence for at least each lower ECU 20, 30. When no abnormalities in the first upper ECU 40 and/or communication abnormalities with the first upper ECU 40 are detected, the PNC configuration information for normal operation is used as the PNC configuration information for each lower ECU 20, 30. However, when abnormalities in the first upper ECU 40 and/or communication abnormalities with the first upper ECU 40 are detected, as described above, the PNC switching unit 16 switches the PNC configuration information for normal operation to the PNC configuration information for abnormal occurrence. As a result, the power/startup management ECU 10 can execute the switching between the startup state and the power-off state of at least the lower ECUs 20, 30 based on NM messages according to the PNC configuration information for abnormal occurrence. The power/startup management ECU 10 can receive NM messages from the second upper ECU 80, the first or second lower ECUs 20, 30, and the sixth or seventh lower ECUs 90, 100, even if abnormalities occur in the first upper ECU 40 and/or communication abnormalities with the first upper ECU 40.

In the PNC configuration information for abnormal occurrence, clusters to which lower ECUs related to the execution of control concerning vehicle driving and occupant safety belong are set to be activatable. This ensures that even if abnormalities occur in the first upper ECU 40 and/or communication abnormalities with the first upper ECU 40, vehicle driving and occupant safety can be maintained. Therefore, for example, the vehicle driver can safely drive the vehicle to a safe location or the nearest repair shop. For instance, lower ECUs related to the execution of control concerning vehicle driving include ECUs involved in executing powertrain (engine or motor) control, steering control, brake control, headlight control, etc. Lower ECUs related to the execution of control concerning occupant safety include ECUs involved in executing airbag control, advanced driver assistance systems (ADAS) control, emergency call system control, etc.

Conversely, in the PNC configuration information for abnormal occurrence, clusters to which lower ECUs not related to the execution of control concerning vehicle driving and occupant safety belong are set to be non-activatable. For example, lower ECUs not related to the execution of control concerning vehicle driving and occupant safety include ECUs involved in executing navigation control, audio control, interior lighting control, seat control, etc. By setting lower ECUs not related to the execution of control concerning vehicle driving and occupant safety to be non-activatable, power savings can be achieved, and sufficient evacuation driving distance can be ensured. It is not necessary to set all clusters to which lower ECUs not related to the execution of control concerning vehicle driving and occupant safety belong to be non-activatable in the PNC configuration information for abnormal occurrence. For example, it may be sufficient to set at least one cluster to which lower ECUs not related to the execution of control concerning vehicle driving and occupant safety belong to be non-activatable.

The PNC switching unit 16, like the abnormality detection unit 15, can be provided in multiple ECUs (upper ECUs and lower ECUs) that hold PNC configuration information. The ECU (e.g., the power/startup management ECU 10) that first detects abnormalities in the first upper ECU 40 and/or communication abnormalities with the first upper ECU 40 preferably transmits information for switching the PNC configuration information for normal operation to the PNC configuration information for abnormal occurrence to other multiple ECUs holding PNC configuration information. In response to receiving this information, it is preferable for each PNC switching unit 16 in the multiple ECUs holding PNC configuration information to switch the PNC configuration information for normal operation to the PNC configuration information for abnormal occurrence. This allows setting ECUs related to the execution of control concerning vehicle driving and occupant safety to be activatable and ECUs not related to the execution of control concerning vehicle driving and occupant safety to be non-activatable for the entire vehicle.

The transmission of information for switching the PNC configuration information for normal operation to the PNC configuration information for abnormal occurrence may include notifying that the ECU detecting abnormalities in the first upper ECU 40 and/or communication abnormalities with the first upper ECU 40 has switched to the PNC configuration information for abnormal occurrence. Additionally, the transmission of information for switching the PNC configuration information for normal operation to the PNC configuration information for abnormal occurrence may include the ECU detecting abnormalities in the first upper ECU 40 and/or communication abnormalities with the first upper ECU 40 sending a switching instruction to the PNC configuration information for abnormal occurrence to other multiple ECUs. Furthermore, if the first upper ECU 40 detects that an abnormality has occurred in communication with at least one ECU, the first upper ECU 40 may also transmit information for switching the PNC configuration information for normal operation to the PNC configuration information for abnormal occurrence to other multiple ECUs holding PNC configuration information.

Thus, in the in-vehicle network system 200 according to this embodiment, if an abnormality occurs in the first upper ECU 40 or communication abnormalities occur with the first upper ECU 40, at least one ECU that detects the abnormality switches the PNC configuration information for normal operation to the PNC configuration information for abnormal occurrence. As a result, at least one ECU is activated according to the PNC configuration information for abnormal occurrence. This allows for appropriate control of the startup of at least one ECU that detects abnormalities, even if abnormalities occur in the first upper ECU 40 or communication abnormalities occur with the first upper ECU 40.

Next, an example of the processing executed by the power/startup management ECU 10 and the first and second lower ECUs 20, 30 will be described with reference to the flowcharts in FIG. 5 and FIG. 6. If the abnormality detection unit 15 and the PNC switching unit 16 are also provided in other ECUs, similar processing is executed, except for the control to turn the relay circuits on and off.

In step S100, the power/startup management ECU 10 determines whether abnormalities in the first upper ECU 40 and/or communication abnormalities with the first upper ECU 40 have been detected. If it is determined that abnormalities have been detected, the power/startup management ECU 10 proceeds to step S110. Conversely, if it is determined that no abnormalities have been detected, the power/startup management ECU 10 proceeds to step S130.

In step S110, the power/startup management ECU 10 switches the PNC configuration information of at least the first and second lower ECUs 20, 30 from the PNC configuration information for normal operation to the PNC configuration information for abnormal occurrence. Then, in step S120, the power/startup management ECU 10 transmits information for switching the PNC configuration information for normal operation to the PNC configuration information for abnormal occurrence to other multiple ECUs holding PNC configuration information.

In step S130, the power/startup management ECU 10 receives or generates an NM message. In step S140, the power/startup management ECU 10 executes the startup ECU identification process to identify the lower ECUs 20, 30 instructed to activate by the NM message. The details of this startup ECU identification process are shown in the flowchart of FIG. 6. Below, the startup ECU identification process will be described with reference to the flowchart in FIG. 6.

In step S300, the power/startup management ECU 10 identifies the cluster requested to be activated based on the PN request information of the NM message. In step S310, the power/startup management ECU 10 reads the PNC configuration information of multiple lower ECUs 20, 30 from the storage unit 14. At this time, if the PNC configuration information has been switched from the PNC configuration information for normal operation to the PNC configuration information for abnormal occurrence, the power/startup management ECU 10 reads the PNC configuration information for abnormal occurrence from the storage unit 14. Then, in step S320, the power/startup management ECU 10 identifies the PNC configuration information containing the cluster matching the cluster requested to be activated (startup request cluster) by the PN request information.

In step S330, the power/startup management ECU 10 determines whether at least one PNC configuration information has been identified as PNC configuration information containing a cluster matching the startup request cluster among the PNC configuration information of multiple lower ECUs 20, 30 in step S320. If at least one PNC configuration information has been identified, the power/startup management ECU 10 proceeds to step S340. Conversely, if no identified PNC configuration information exists, the power/startup management ECU 10 proceeds to step S350.

In step S340, the power/startup management ECU 10 sets the lower ECUs 20, 30 corresponding to the identified PNC configuration information as startup ECUs and sets the other lower ECUs 20, 30 as non-startup ECUs. Conversely, in step S350, the power/startup management ECU 10 sets all lower ECUs 20, 30 as non-startup ECUs. Afterward, the power/startup management ECU 10 returns to the processing shown in the flowchart of FIG. 5.

Figure 5:
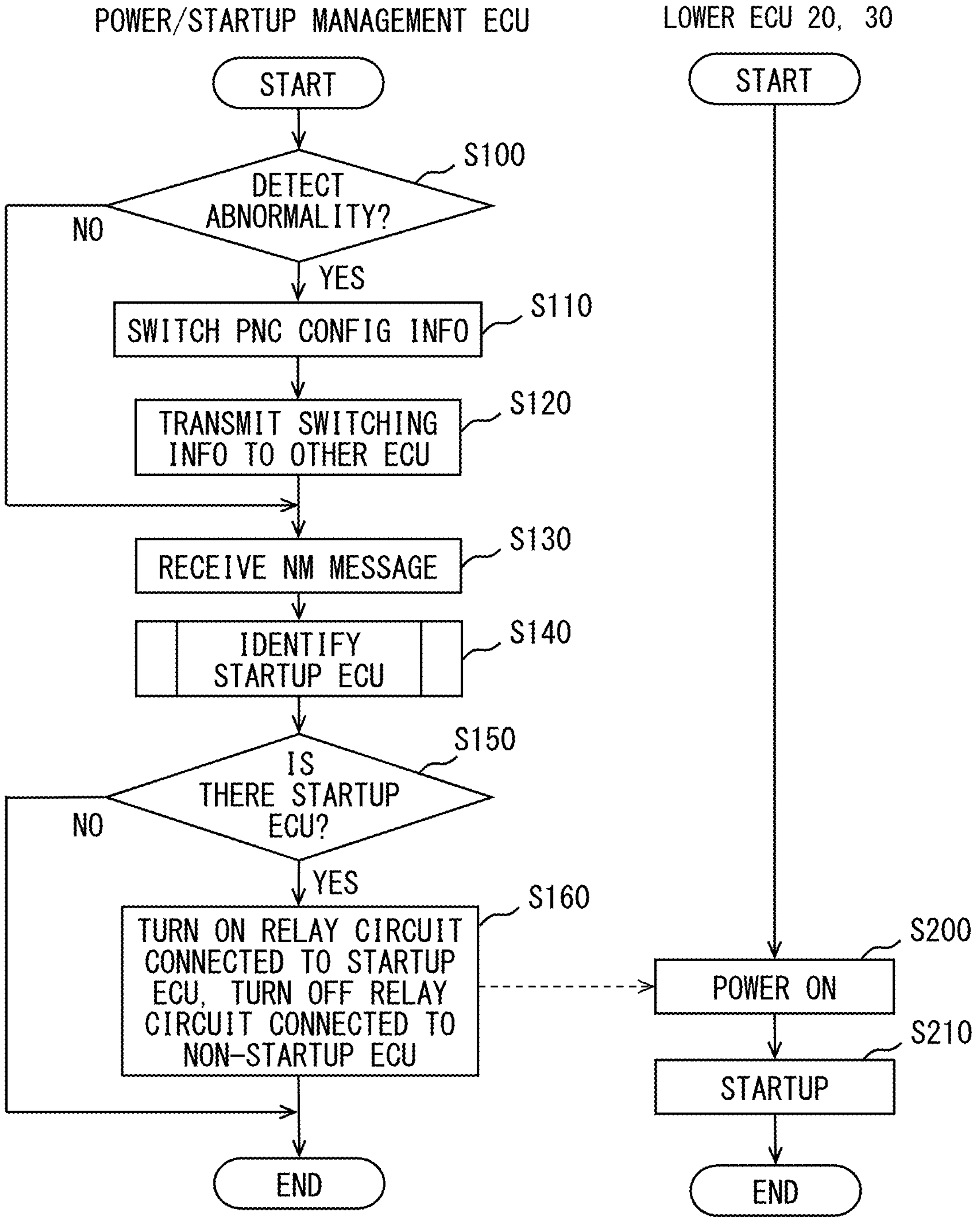
FIG. 5 is a flowchart showing an example of processing executed in the power/startup management ECU and the lower ECU according to the first embodiment.
Figure 6:
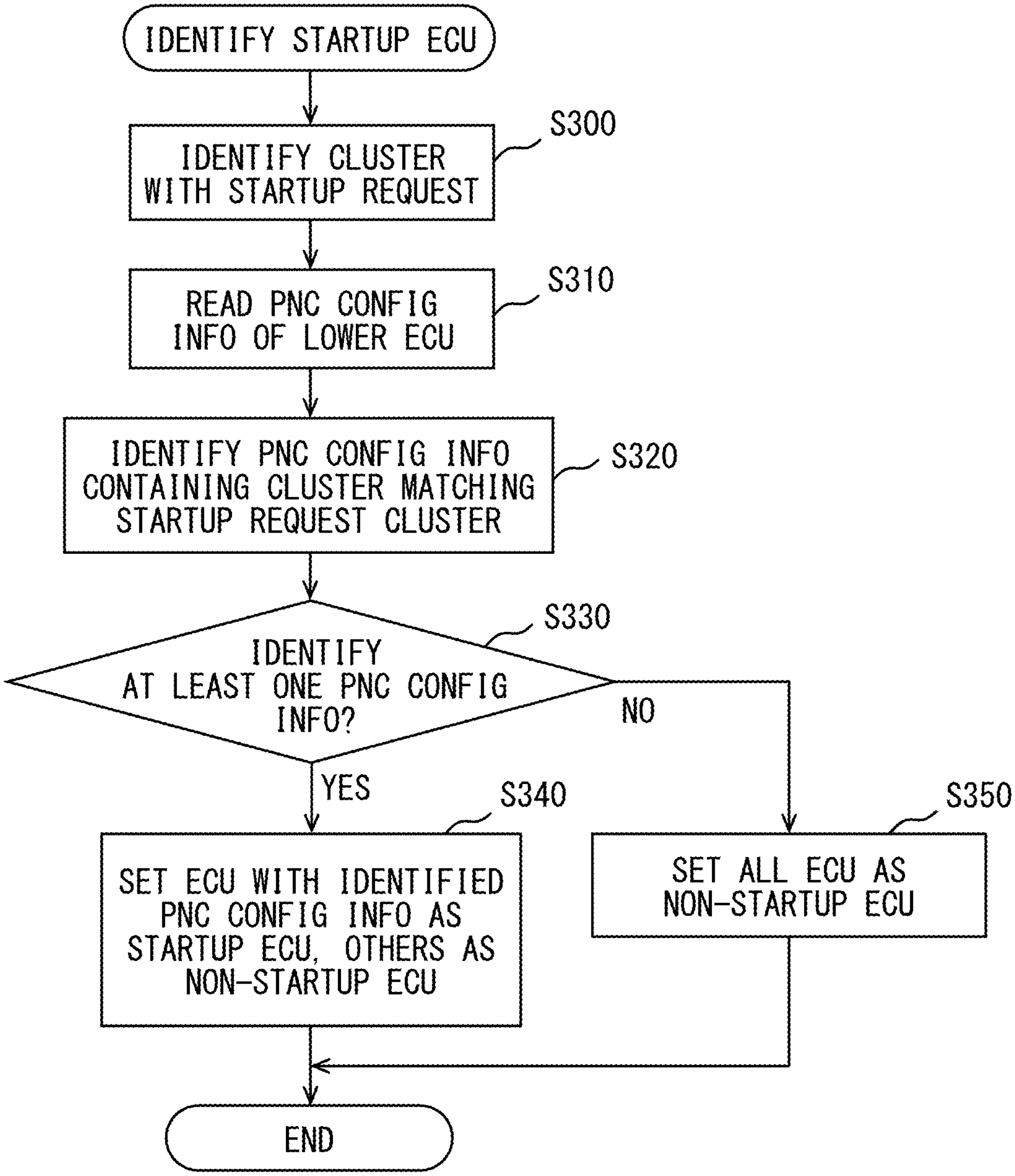
FIG. 6 is a flowchart showing details of the startup ECU identification process in the flowchart of FIG. 5.

In step S150 of the flowchart in FIG. 5, the power/startup management ECU 10 determines whether there are lower ECUs 20, 30 set as startup ECUs. If there are lower ECUs 20, 30 set as startup ECUs, the power/startup management ECU 10 proceeds to step S160. Conversely, if there are no lower ECUs 20, 30 set as startup ECUs, the power/startup management ECU 10 terminates the processing shown in the flowchart of FIG. 5. In this case, the NM message is discarded.

In step S160, the power/startup management ECU 10 turns on the relay circuits 17, 18 connected to the lower ECUs 20, 30 set as startup ECUs based on the relay connection information stored in the storage unit 14 indicating the correspondence between each relay circuit 17, 18 and each lower ECU 20, 30. Additionally, the power/startup management ECU 10 turns off the relay circuits 17, 18 connected to the lower ECUs 20, 30 set as non-startup ECUs.

As shown in step S200 of the flowchart in FIG. 5, power supply is initiated for the lower ECUs 20, 30 with relay circuits 17, 18 turned on. Consequently, the lower ECUs 20, 30 with relay circuits 17, 18 turned on undergo predetermined processing for startup in step S210 and enter the startup state.

As described above, according to the in-vehicle network system 200 of this embodiment, the power/startup management ECU 10 receives NM messages that selectively instruct the startup of multiple lower ECUs 20, 30 via the communication bus on behalf of multiple lower ECUs 20, 30. Then, the power/startup management ECU 10 turns on the relay circuits 17, 18 connected to the lower ECUs 20, 30 instructed to activate by the NM message. As a result, the lower ECUs 20, 30 instructed to activate enter the startup state. Therefore, according to the in-vehicle network system 200 of this embodiment, it is possible to finely manage the power supply and stoppage to the lower ECUs 20, 30 while configuring the system to switch the power supply to the lower ECUs 20, 30 from the stopped state to the supply state in response to NM messages instructing startup.

Second Embodiment

The second embodiment of the in-vehicle network system and the control method for the in-vehicle network system according to the present disclosure will be described. The in-vehicle network system according to this embodiment is configured similarly to the in-vehicle network system 200 of the first embodiment. Therefore, the description of the configuration will be omitted.

Figure 7:
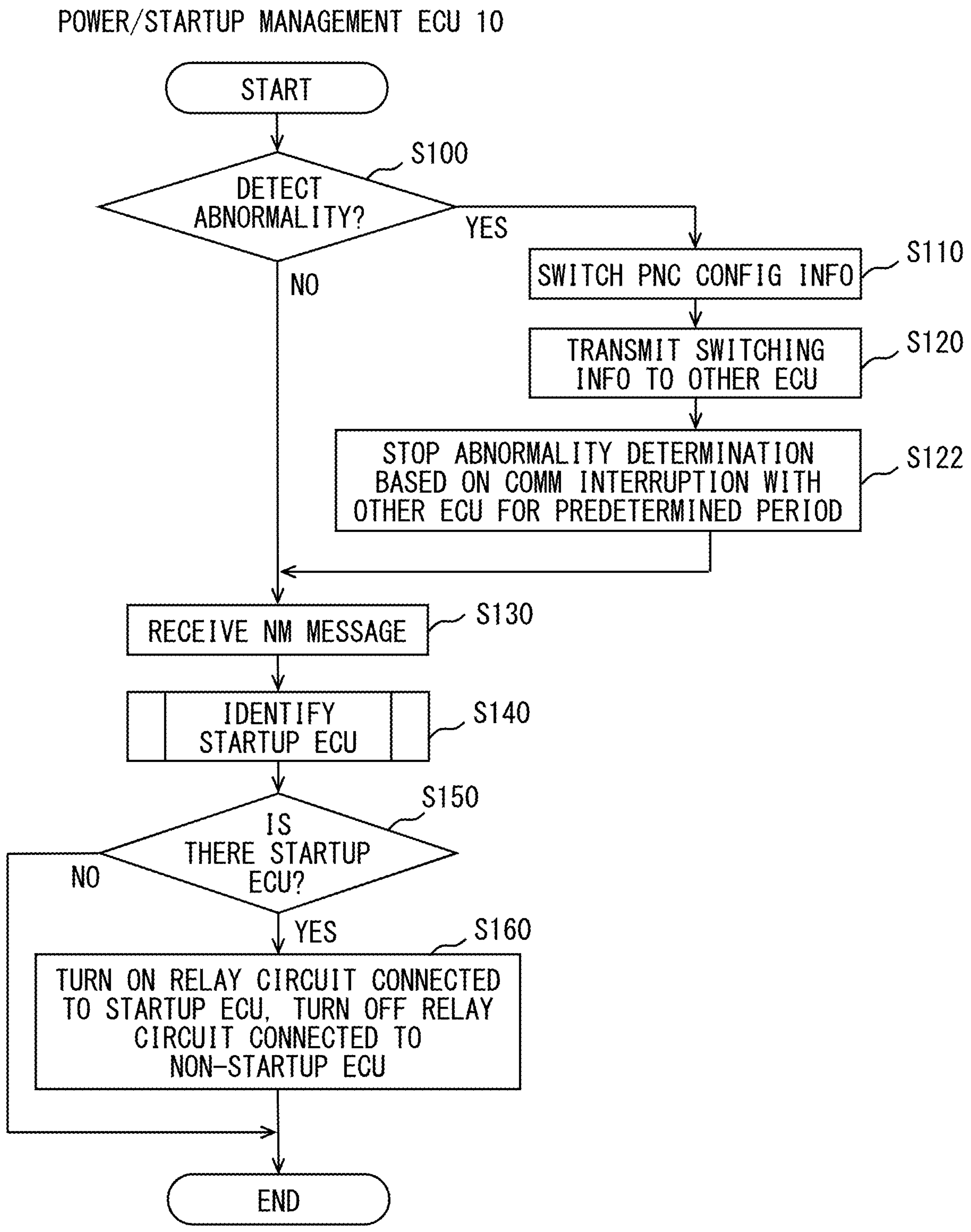
FIG. 7 is a flowchart showing an example of processing executed in the power/startup management ECU according to the second embodiment.

FIG. 7 is a flowchart illustrating an example of the processing executed by the power/startup management ECU 10 according to this embodiment. In the flowchart of FIG. 7, steps that execute the same processing as the flowchart shown in FIG. 5 are assigned the same step numbers, and their descriptions are omitted.

As shown in the flowchart of FIG. 7, the power/startup management ECU 10 according to this embodiment transmits information for switching the PNC configuration information for normal operation to the PNC configuration information for abnormal occurrence to other multiple ECUs holding PNC configuration information in step S120. Subsequently, in step S122, the power/startup management ECU 10 stops the abnormality determination based on communication interruption with other ECUs for a predetermined period.

As described above, each lower ECU 20, 30, 50, 60, 70, 90, 100 transitions to the normal operation mode when it becomes active, that is, in a startup state, and periodically transmits NM messages to other ECUs while performing its normal operations. Furthermore, the power/startup management ECU 10, along with the first and second upper ECUs 40, 80, also periodically transmit NM messages as long as control needs to be continued. Therefore, if communication is interrupted for a predetermined time or more between each ECU 10, 20, 30, 40, 50, 60, 70, 80, 90, 100 and the ECUs with which periodic NM message transmission and reception should occur, it can be determined that some abnormality, including communication abnormality, has occurred in the relevant ECU.

However, the switching of the PNC configuration information for the lower ECUs 20, 30 in the power/startup management ECU 10 and the switching of PNC configuration information in multiple other ECUs based on information for switching the PNC configuration information for normal operation to the PNC configuration information for abnormal occurrence do not necessarily occur simultaneously. Therefore, due to the timing difference in switching, the clusters that should become active according to the PNC configuration information may differ among multiple ECUs. Consequently, if abnormality determination based on communication interruption between ECUs is performed, there may be a possibility of incorrect abnormality determination.

Therefore, in this embodiment, the processing in step S122 stops the abnormality determination based on communication interruption with other ECUs for a predetermined period corresponding to the duration required for the completion of PNC configuration information switching in multiple ECUs, including the power/startup management ECU 10. This prevents incorrect abnormality determination based on communication interruption with other ECUs.

Third Embodiment

The third embodiment of the in-vehicle network system and the control method for the in-vehicle network system according to the present disclosure will be described. The in-vehicle network system according to this embodiment is configured similarly to the in-vehicle network system 200 of the first embodiment. Therefore, the description of the configuration will be omitted.

Figure 8:
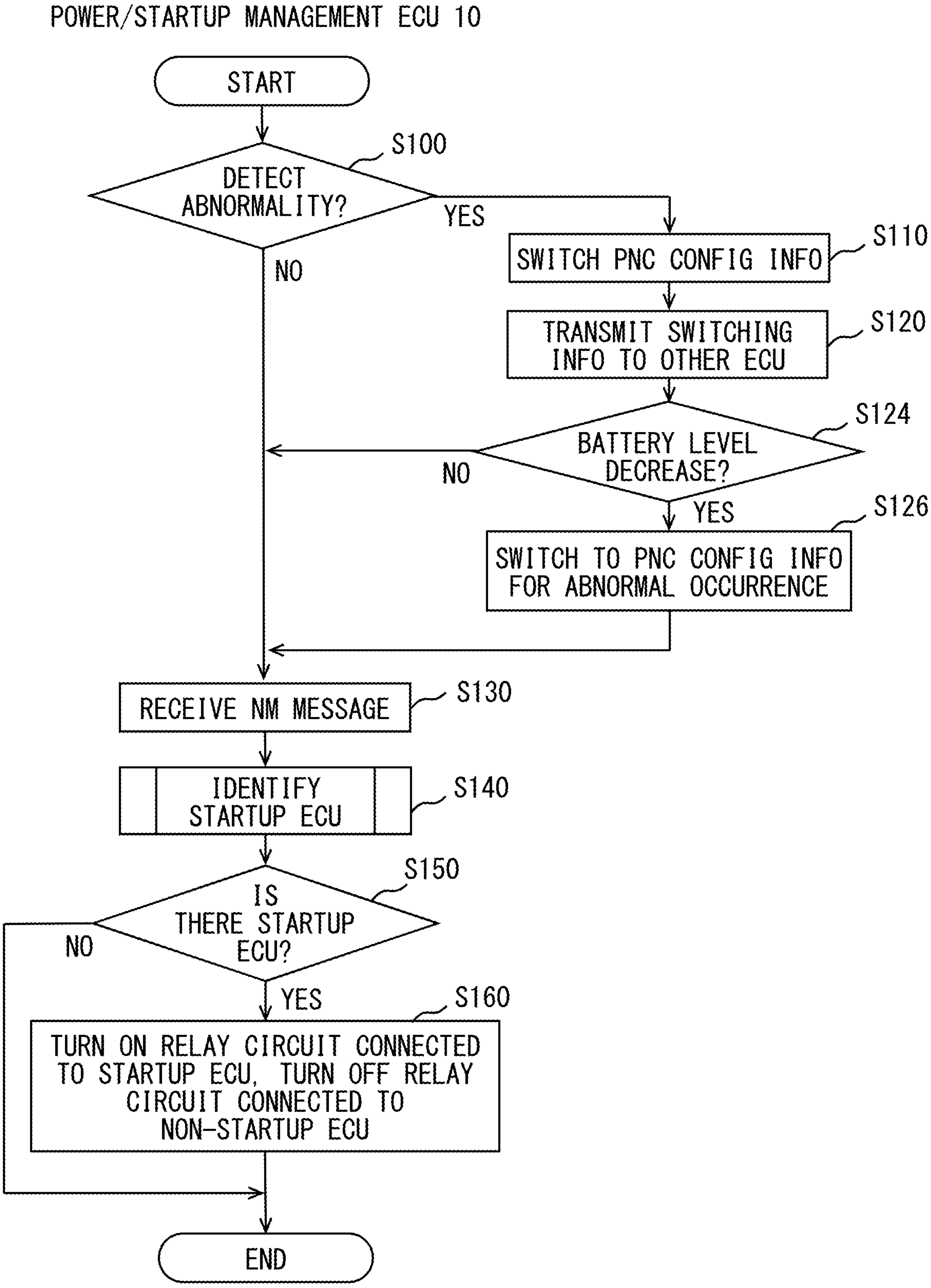
FIG. 8 is a flowchart showing an example of processing executed in the power/startup management ECU according to the third embodiment.

FIG. 8 is a flowchart illustrating an example of the processing executed by the power/startup management ECU 10 according to this embodiment. In the flowchart of FIG. 8, steps that execute the same processing as the flowchart shown in FIG. 5 are assigned the same step numbers, and their descriptions are omitted.

As shown in the flowchart of FIG. 8, the power/startup management ECU 10 according to this embodiment determines whether the remaining capacity of the battery 2 has decreased below a predetermined value in step S124. If it is determined in this determination process that the remaining capacity of the battery 2 has decreased below the predetermined value, the power/startup management ECU 10 proceeds to step S126.

In step S126, the power/startup management ECU 10 switches the PNC configuration information for abnormal occurrence so that the number of clusters set to be activatable is reduced. By changing the number of clusters activated by the PNC configuration information for abnormal occurrence according to the remaining capacity of the battery 2, it becomes easier to secure power for evacuation driving.

In this embodiment, the storage unit 14 stores multiple types of PNC configuration information as PNC configuration information for abnormal occurrence, with different numbers of clusters set to be activatable. The PNC configuration information for abnormal occurrence is prepared in multiple versions. The multiple types of PNC configuration information may differ, for example, in the number of clusters set to be non-activatable among clusters to which ECUs related to the execution of control concerning vehicle driving and occupant safety do not belong. Furthermore, the multiple types of PNC configuration information may differ, for example, in the number of clusters set to be non-activatable among clusters to which ECUs related to the execution of control concerning vehicle driving and occupant safety belong.

Figure 9:
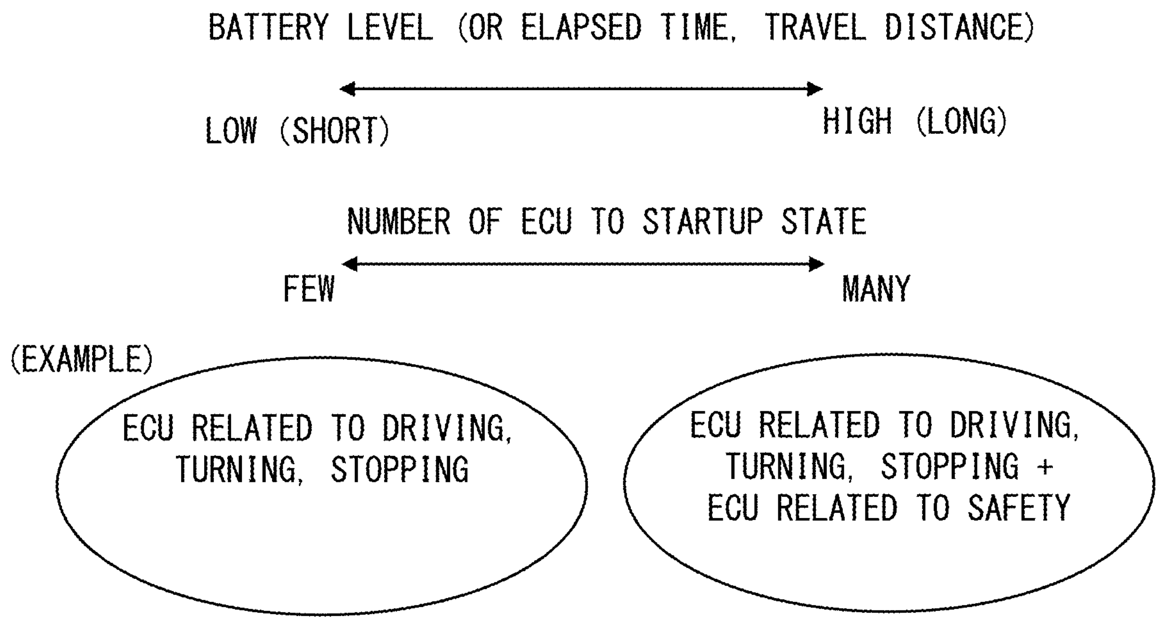
FIG. 9 is an explanatory diagram for explaining the operation in the in-vehicle network system according to the third embodiment.

For example, FIG. 9 shows an example where the number of clusters set to be non-activatable among clusters to which ECUs related to the execution of control concerning vehicle driving and occupant safety belong is varied according to the remaining capacity of the battery 2. Specifically, in the example shown in FIG. 9, the PNC configuration information for when the remaining capacity of the battery 2 is relatively high sets both clusters to which ECUs related to the execution of control concerning vehicle driving (driving, stopping, turning) and clusters to which ECUs related to the execution of control concerning occupant safety belong to be activatable. Conversely, in the PNC configuration information for when the remaining capacity of the battery 2 is relatively low, clusters to which ECUs related to the execution of control concerning vehicle driving belong are set to be activatable, but clusters to which ECUs related to the execution of control concerning occupant safety belong are set to be non-activatable.

Instead of or in addition to the remaining capacity of the battery 2, the PNC configuration information for abnormal occurrence may be switched so that the number of clusters set to be activatable is reduced according to the elapsed time since the detection of an abnormality exceeding a predetermined time and/or the driving distance since the detection of an abnormality exceeding a predetermined distance. Furthermore, by setting multiple thresholds for the remaining capacity of the battery 2, elapsed time, and/or driving distance, the switching of the PNC configuration information for abnormal occurrence may be executed multiple times, not just once.

Fourth Embodiment

The fourth embodiment of the in-vehicle network system and the control method for the in-vehicle network system according to the present disclosure will be described. The in-vehicle network system according to this embodiment is configured similarly to the in-vehicle network system 200 of the first embodiment. Therefore, the description of the configuration will be omitted.

Figure 10:
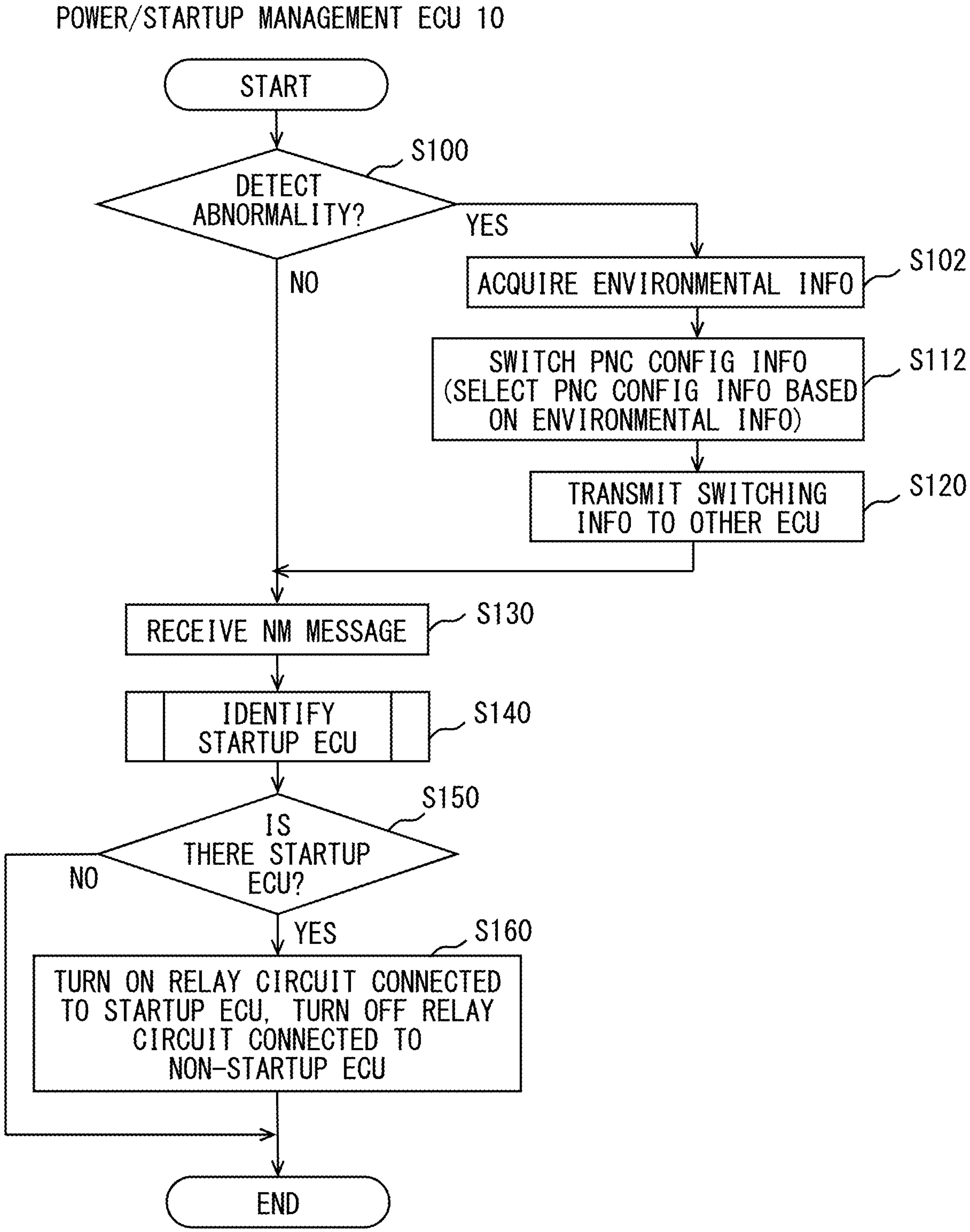
FIG. 10 is a flowchart showing an example of processing executed in the power/startup management ECU according to the fourth embodiment.

FIG. 10 is a flowchart illustrating an example of the processing executed by the power/startup management ECU 10 according to this embodiment. In the flowchart of FIG. 10, steps that execute the same processing as the flowchart shown in FIG. 5 are assigned the same step numbers, and their descriptions are omitted.

As shown in the flowchart of FIG. 10, when the power/startup management ECU 10 according to this embodiment determines in step S100 that abnormalities in the first upper ECU 40 and/or communication abnormalities with the first upper ECU 40 have been detected, the power/startup management ECU 10 executes the processing in step S102. In step S102, the power/startup management ECU 10 acquires environmental information such as time information, weather information, and/or outside temperature information at the time the abnormality occurred. Then, in step S112, the power/startup management ECU 10 switches the PNC configuration information of each lower ECU 20, 30 from the PNC configuration information for normal operation to the PNC configuration information for abnormal occurrence. The switched PNC configuration information for abnormal occurrence is selected according to the environmental information acquired in step S102.

In this embodiment, the storage unit 14 stores multiple types of PNC configuration information as PNC configuration information for abnormal occurrence, set to suit the vehicle's environment at different times. The multiple types of PNC configuration information may include, for example, PNC configuration information suitable for daytime and PNC configuration information suitable for nighttime, differing in whether clusters to which ECUs related to lighting control such as headlights belong are activated. Additionally, the multiple types of PNC configuration information may include PNC configuration information for clear weather and PNC configuration information for rainy weather, differing in whether clusters to which ECUs related to wiper control belong are activated. Furthermore, the multiple types of PNC configuration information may include PNC configuration information for low and high temperatures and PNC configuration information for normal temperatures, differing in whether clusters to which ECUs related to an air conditioner performing air conditioning for the vehicle interior or control for apparatus performing temperature control for the driving battery belong are activated.

According to this embodiment, it becomes possible to use the PNC configuration information suitable for the vehicle's environment at the time of abnormal occurrence as the PNC configuration information for abnormal occurrence.

This embodiment can be implemented in combination with the aforementioned embodiments. For example, when combined with the third embodiment, multiple types of PNC configuration information suitable for the vehicle's environment at the time of abnormal occurrence can be defined with different numbers of clusters that can be activated according to the battery's remaining capacity, elapsed time, and/or driving distance.

Fifth Embodiment

The fifth embodiment of the in-vehicle network system and the control method for the in-vehicle network system according to the present disclosure will be described. The in-vehicle network system according to this embodiment is configured similarly to the in-vehicle network system 200 of the first embodiment. Therefore, the description of the configuration will be omitted.

Figure 11:
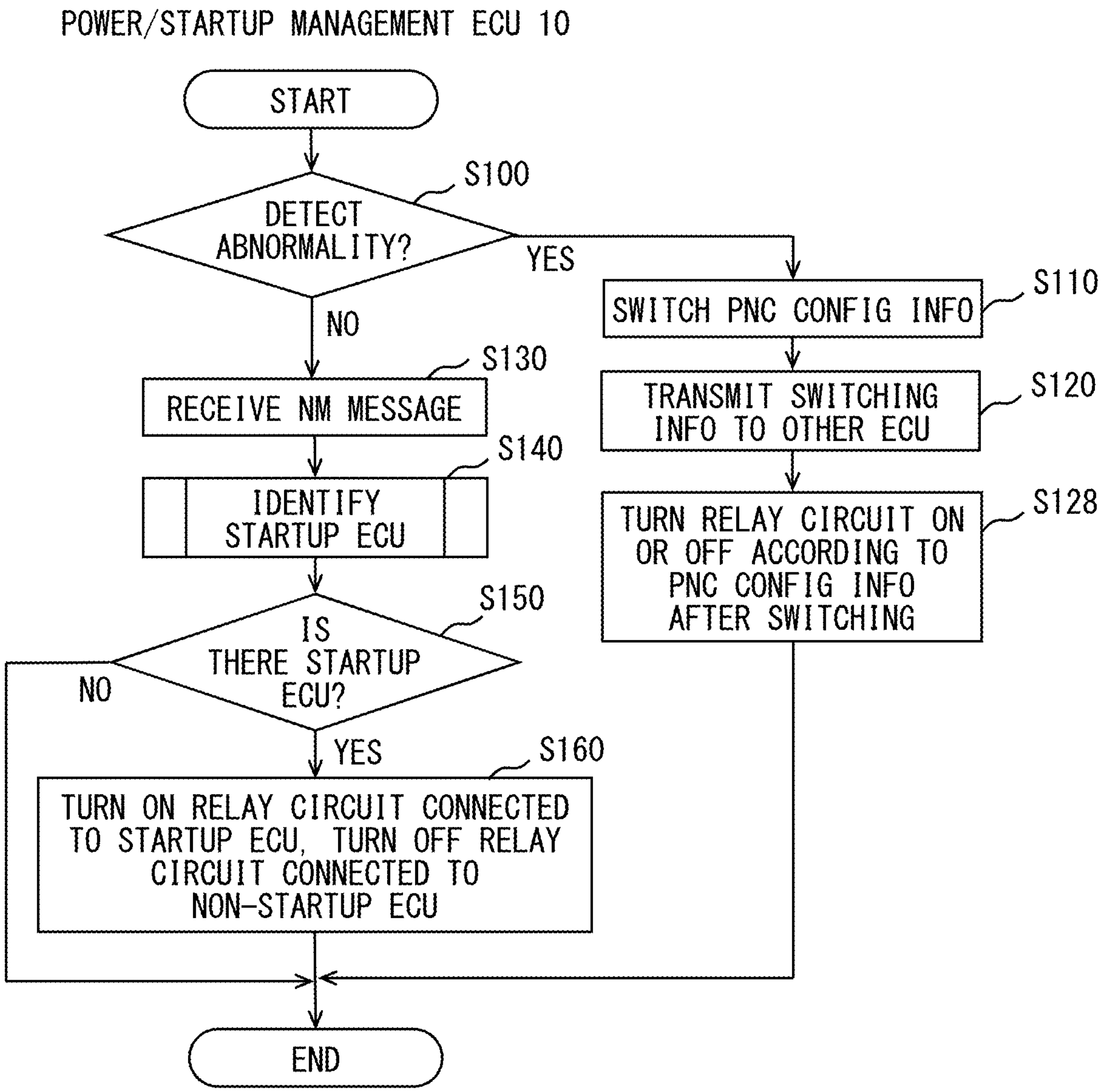
FIG. 11 is a flowchart showing an example of processing executed in the power/startup management ECU according to the fifth embodiment.

FIG. 11 is a flowchart illustrating an example of the processing executed by the power/startup management ECU 10 according to this embodiment. In the flowchart of FIG. 11, steps that execute the same processing as the flowchart shown in FIG. 5 are assigned the same step numbers, and their descriptions are omitted.

As shown in the flowchart of FIG. 11, the power/startup management ECU 10 according to this embodiment turns on and off the first and second relay circuits 17, 18 in step S128 according to the PNC configuration information for abnormal occurrence switched in step S110. In other words, the power/startup management ECU 10 turns on the relay circuits of lower ECUs belonging to clusters indicating startup and turns off the relay circuits of lower ECUs belonging to clusters not indicating startup, regardless of the reception of NM messages, based on the switched PNC configuration information for abnormal occurrence.

According to this embodiment, when abnormalities occur in the first upper ECU 40 and/or communication abnormalities with the first upper ECU 40, it is possible to reliably activate at least the lower ECUs related to the execution of control concerning vehicle driving and occupant safety.

In this embodiment, even if NM messages are received by the power/startup management ECU 10, the control to turn on and off the relay circuits 17, 18 based on NM messages is not executed. The received NM messages are discarded. Additionally, this embodiment describes an example of turning on and off the first and second relay circuits 17, 18 according to the switched PNC configuration information for abnormal occurrence. However, instead of using the PNC configuration information for abnormal occurrence, the relay circuits to be turned on and off may be predetermined by considering the functions of each lower ECU 20, 30, storing the on/off information, and turning on and off the first and second relay circuits 17, 18 based on the stored on/off information.

The systems and methods described in this disclosure may be implemented by a dedicated computer configured with a processor programmed to execute one or more functions embodied by a computer program. The systems and methods described in this disclosure may be implemented using dedicated hardware logic circuits. The systems and methods described in this disclosure may be implemented by one or more dedicated computers configured with a combination of a processor executing a computer program and one or more hardware logic circuits. For example, some or all of the functions provided by the power/startup management ECU 10 may be implemented as hardware. The manner of implementing certain functions as hardware may include using one or more ICs, among other approaches. Some or all of the functions provided by the power/startup management ECU 10 may be implemented using a System-on-Chip (SoC), Integrated Circuit (IC), or Field-Programmable Gate Array (FPGA). The concept of IC includes Application Specific Integrated Circuit (ASIC). Additionally, the computer program may be stored as instructions executable by a computer on a non-transitory tangible storage medium. Possible recording media for the program include HDD (Hard-disk Drive), SSD (Solid State Drive), flash memory, etc. Furthermore, the form of a program to make a computer function as the power/startup management ECU 10, and non-transitory tangible storage media such as semiconductor memory storing this program, are also within the scope of this disclosure.

What is claimed is:

1. An in-vehicle network system comprising:

a plurality of control devices connected to a communication bus, each of the plurality of the control devices including at least one of (i) a circuit and (ii) a processor with a memory storing computer program code executable by the processor, the at least one of the circuit and the processor configured to cause the control device to communicate with each other in a vehicle, wherein the plurality of the control devices includes a plurality of startup control target control devices, each of which stores cluster configuration information indicating a cluster to which it belongs within a plurality of divided clusters, and when a network management message transmitted from another control device includes startup cluster information indicating a cluster to be activated that matches the cluster in the cluster configuration information, each startup control target control device enters to a startup state or maintains the startup state, the plurality of the control devices further include a management control device configured to change the cluster configuration information of the plurality of the startup control target control devices, the plurality of the startup control target control devices have cluster configuration information for normal operation and cluster configuration information for abnormal occurrence, as the cluster configuration information, and at least one of the startup control target control devices that detects occurrence of an abnormality in the management control device or an abnormality in communication with the management control device switches the cluster configuration information for normal operation to the cluster configuration information for abnormal occurrence.

2. The in-vehicle network system according to claim 1, wherein in the cluster configuration information for abnormal occurrence, a cluster to which a control device related to executing control concerning vehicle driving and occupant safety belongs is activatable.

3. The in-vehicle network system according to claim 2, wherein in the cluster configuration information for abnormal occurrence, a cluster to which a control device related to executing control concerning vehicle driving and occupant safety does not belong is set as non-activatable.

4. The in-vehicle network system according to claim 1, wherein at least one of the startup control target control devices periodically communicates with the management control device, and the at least one of the startup control target control devices detects an abnormality in communication with the management control device when a communication, which is periodical, is interrupted for a predetermined time or more, and/or when an abnormality is detected in a communication data received.

5. The in-vehicle network system according to claim 1, wherein the at least one of the startup control target control devices receives data value related to control from the management control device, and the at least one of the startup control target control devices detects an abnormality in the management control device based on the data value received.

6. The in-vehicle network system according to claim 1, wherein the at least one of the startup control target control devices that has detected an occurrence of an abnormality in the management control device or an abnormality in communication with the management control device, and/or the management control device transmits information to another startup control target control device to switch the cluster configuration information for normal operation to the cluster configuration information for abnormal occurrence.

7. The in-vehicle network system according to claim 6, wherein when the cluster configuration information is switched based on the information transmitted, the plurality of startup control target control devices suspend abnormality determination based on communication interruption with another startup control target control device.

8. The in-vehicle network system according to claim 1, wherein the cluster configuration information for abnormal occurrence is prepared in multiple versions, and the startup control target control devices switch the cluster configuration information for abnormal occurrence to reduce the number of clusters set as activatable decreases according to (i) an elapsed time since the occurrence of the abnormality, (ii) a travel distance since the occurrence of the abnormality, and/or (iii) decrease in remaining power of a battery storing power for driving the vehicle.

9. The in-vehicle network system according to claim 1, wherein the cluster configuration information for abnormal occurrence is prepared in multiple versions, and the startup control target control devices select one cluster configuration information for abnormal occurrence to be used from among a plurality of cluster configuration information for abnormal occurrence based on (i) time information, (ii) weather information, and/or (iii) outside temperature information at a time the abnormality occurs.

10. The in-vehicle network system according to claim 1, wherein the plurality of startup control target control devices includes a combination of an upper control device configured to switch power supply to at least one lower control device using at least one relay circuit, and the lower control device, the upper control device includes a storage unit configured to store cluster configuration information indicating a cluster to which the lower control device belong, the upper control device receives the network management message on behalf of the lower control device, and when the cluster to be activated indicated by the startup cluster information of the network management message matches the cluster of the cluster configuration information of the lower control device, the upper control device turns on the relay circuit to supply power to the lower control device and bring the lower control device to a startup state.

11. The in-vehicle network system according to claim 10, wherein the storage unit stores cluster configuration information for normal operation and cluster configuration information for abnormal occurrence as the cluster configuration information of the lower control device, and the upper control device switches the cluster configuration information of the lower control device from the cluster configuration information for normal operation to the cluster configuration information for abnormal occurrence upon detecting an occurrence of an abnormality in the management control device or an abnormality in communication with the management control device.

12. The in-vehicle network system according to claim 10, wherein a plurality of lower control devices are provided, a plurality of relay circuits are provided corresponding to the plurality of the lower control devices, and the storage unit stores relay connection information indicating a correspondence between the plurality of the lower control devices and the plurality of relay circuits in addition to the cluster configuration information of each of the plurality of the lower control devices.

13. The in-vehicle network system according to claim 12, wherein the upper control device turns on a relay circuit corresponding to the lower control device whose cluster configuration information matches a startup cluster specified by the startup cluster information included in the network management message, based on the cluster configuration information and the relay connection information, and turns off a relay circuit corresponding to the lower control device whose cluster configuration information does not match.

14. The in-vehicle network system according to claim 10, wherein upon detecting an occurrence of an abnormality in the management control device or an abnormality in communication with the management control device, the upper control device turns on a relay circuit of the lower control device related to executing control concerning vehicle driving and occupant safety, and turns off a relay circuit of the lower control device not related to executing control concerning vehicle driving and occupant safety.

15. The in-vehicle network system according to claim 14, wherein the upper control device, based on the cluster configuration information for abnormal occurrence, determines whether the lower control device is related to executing control concerning vehicle driving and occupant safety.

16. A method for controlling an in-vehicle network system including a plurality of control devices connected to a communication bus and configured to communicate with each other in a vehicle, wherein the plurality of the control devices includes a plurality of startup control target control devices, each of which stores cluster configuration information indicating a cluster to which it belongs within a plurality of divided clusters, and when a network management message transmitted from another control device includes startup cluster information indicating a cluster to be activated that matches the cluster in the cluster configuration information, each startup control target control device enters to a startup state or maintains the startup state, the plurality of the control devices further include a management control device configured to change the cluster configuration information of the plurality of the startup control target control devices, the plurality of the startup control target control devices have cluster configuration information for normal operation and cluster configuration information for abnormal occurrence, as the cluster configuration information, the method comprising:

by at least one of the startup control target control devices, detecting occurrence of an abnormality in the management control device or an abnormality in communication with the management control device; and by the least one of the startup control target control devices that has detected the occurrence of the abnormality, switching the cluster configuration information for normal operation to the cluster configuration information for abnormal occurrence.

* * * * *